UNITED STATES PATENT OFFICE.

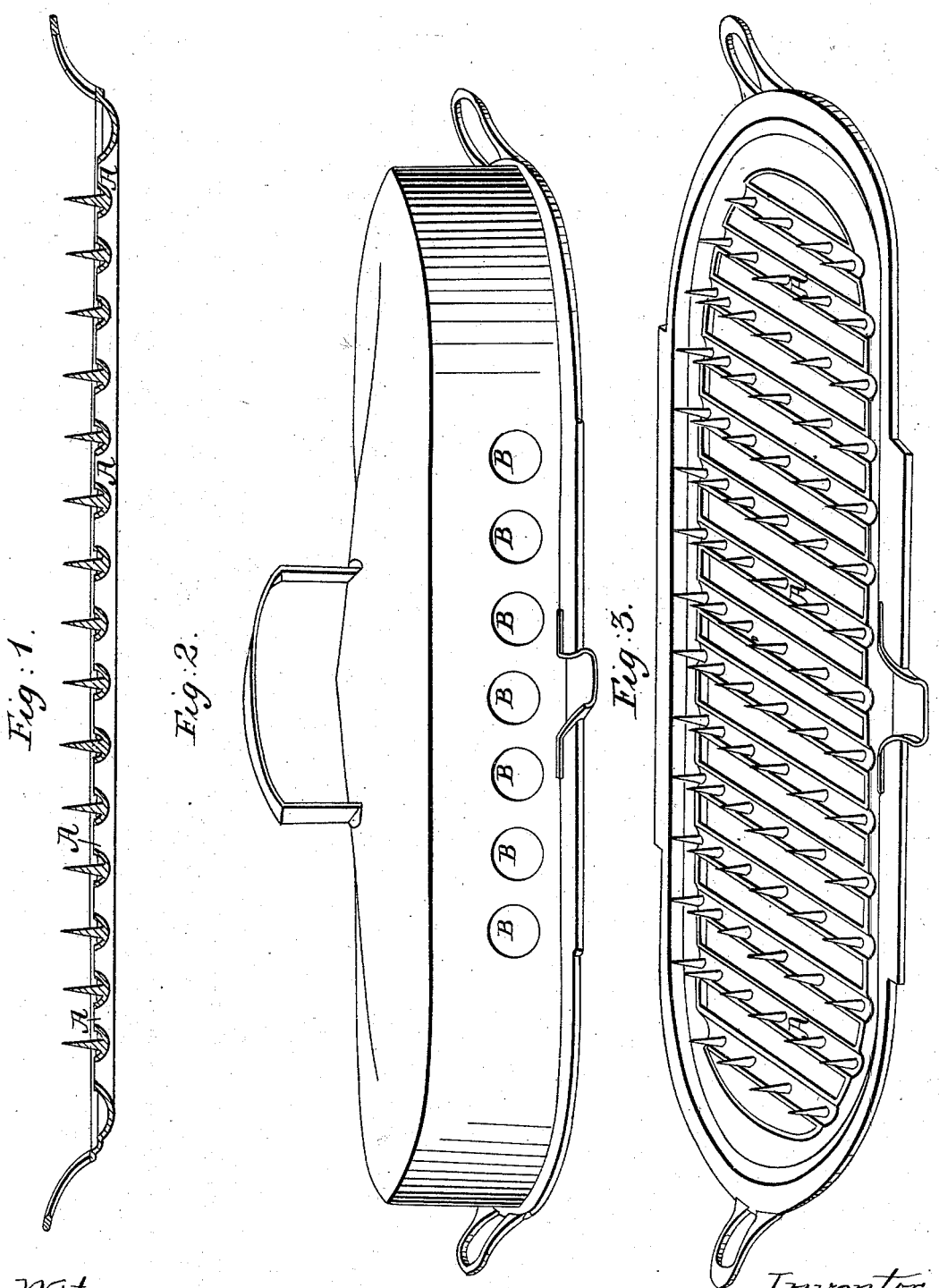

WM. BENNETT, OF NEW YORK, N. Y.

GRIDIRON.

Specification of Letters Patent No. 15,799, dated September 30, 1856.

*To all whom it may concern:*

Be it known that I, WILLIAM BENNETT, of the city and county and State of New York, have invented a new and useful Improvement in Gridirons and a Ventilating Cover for the Same for the Broiling of Beefsteaks, Meats, Fish, &c.; and I do hereby declare that the following is a full, clear, and exact description of the construction and operation of the same, reference being had to the annexed drawings, making a part of this specification, in which—

Figure 1 is a sectional view, Fig. 2 is a perspective view of the gridiron and ventilating cover complete, and Fig. 3 is a perspective view of the interior of the gridiron.

I make the gridiron of cast-iron or any other suitable material of any required size or form. To the bars or seats on which the meats &c. are generally placed for broiling (in an ordinary gridiron) I attach any number of pins or elevators, of any height which I may deem proper. These pins or elevators are inserted in or cast onto the bars or seats A A at any distance apart and of any form which may be required.

I make a cover for the gridiron of tin or any other suitable material with several openings or holes B, B, made in the side and in such a manner as to admit a current of air to pass between the meats &c. and the fire while broiling, producing a downward draft by which the gases from the fire and the smoke from the meats &c. are conveyed into the smoke flue of the range or stove.

The pins or elevators upon which the meats &c. to be broiled are laid, presenting the smallest possible point of contact with the meat prevent the same from being burned as when laid directly upon the hot bars as in the ordinary mode. The meat is thus cooked by the direct action of the heat upon it, not conducted by the hot iron, but reflected directly from the fire. By this process the juices of the meat are retained and cooked into the meat giving to it that peculiar flavor so essential to a good beef steak. This I consider an improvement as I have found that wherever the meats come in contact with the hot iron bars or seats of the ordinary broiling iron, they are deprived in a great measure of those rich juices, burned and rendered unfit for the table.

I do not claim as my invention either the gridiron or cover—but

What I do claim as my invention and desire to secure by Letters Patent, is—

The pins or elevators attached to the bars or seats of the gridirons as set forth, used in connection with the ventilating cover, constructed and arranged substantially as herein described.

WILLIAM BENNETT.

Witnesses:
 GEO. L. CANNON,
 WM. H. CORNELL.